United States Patent Office 3,494,904
Patented Feb. 10, 1970

3,494,904
COPOLYMERS OF ETHYLENE AND POLYALKYLENE GLYCOL ETHER ESTERS OF ACRYLIC ACIDS
George E. Waples, Jr., Lake Jackson, Tex., assignor to The Dow Chemical Company, Midland, Mich., a corporation of Delaware
No Drawing. Continuation-in-part of application Ser. No. 454,170, May 7, 1965. This application Sept. 18, 1968, Ser. No. 760,673
Int. Cl. C08f 15/16
U.S. Cl. 260—86.7                                2 Claims

ABSTRACT OF THE DISCLOSURE

A copolymer of ethylene and a polyalkylene glycol ether ester of acrylic acid or methacrylic acid having 2–10 alkenoxy groups of 2–3 carbon atoms and a terminal alkoxy group of 1–4 carbon atoms useful to make molded articles such as cable jackets, shipping bags and shrink films.

CROSS REFERENCES TO OTHER APPLICATIONS

This is a continuation-in-part of application Ser. No. 454,170, filed May 7, 1965 now abandoned.

BRIEF SUMMARY OF THE INVENTION

The present invention relates to ethylene copolymers and more particularly to copolymers of ethylene and a glycol ether ester of an acrylic acid.

According to the present invention solid ethylene copolymers are prepared by polymerizing ethylene with a polyalkylene glycol ether ester of acrylic acid or methacrylic acid. The resulting copolymers have a melt index in the range of .01–15.00 and an average molecular weight in the range of from about 20,000 to about 65,000 by solution viscosity as measured in Decalin.

DETAILED DESCRIPTION

The polyalkylene glycol ether moiety of the polyalkylene glycol ether ester of an acrylic acid useful for the purposes of the present invention contains from 2 to 10 alkylenoxy groups in a straight chain, each alkylenoxy group having from 2 to 3 carbon atoms, and a terminal lower alkoxy group having from 1 to 4 carbon atoms. Examples of such polyalkylene glycol ether esters of acrylic or methacrylic acids are dipropylene glycol methyl ether acrylate, dipropylene glycol ethyl ether acrylate, dipropylene glycol n-butyl ether acrylate, diethylene glycol methyl ether acrylate, diethylene glycol methyl ether acrylate, diethylene glycol ethyl ether acrylate, diethylene glycol n-butyl ether acrylate, tripropylene glycol methyl ether acrylate, tripropylene glycol ethyl ether acrylate, tripropylene glycol n-butyl ether acrylate, diethylene glycol methyl ether methacrylate, diethylene glycol ethyl ether methacrylate, diethylene glycol n-butyl ether methacrylate, tripropylene glycol methyl ether methacrylate, tripropylene glycol ethyl ether methacrylate, and tripropylene glycol n-butyl ether methacrylate.

Copolymer compositions of the present invention are obtained by reacting a major proportion of ethylene i.e. from about 63 to 99 percent by weight ethylene with about 1 to about 37 percent by weight of the polyalkylene glycol ether-acrylic acid ester, and preferably about 65 to about 90 percent by weight ethylene and about 10 to about 35 percent by weight of the polyalkylene glycol ether-acrylic acid ester.

The copolymers can be prepared by polymerizing mixtures of ethylene and the polyalkylene glycol ether-acrylic acid ester in tubular or autoclave reactors at pressures from about 12,000 to 30,000 pounds per square inch, or higher, and at temperatures from about 150° C. to about 250° C. using, at catalytically effective concentrations, free radical producing polymerization catalysts as azo catalysts like $\alpha,\alpha$-azobisisobutyronitrile and peroxygen-type catalysts such as diethyl peroxide, hydrogen peroxide, di-tertiary butyl peroxide, persuccinic acid, lauroyl hydroperoxide, tetrahydronaphthalene peroxide, alkali metal, alkaline earth metal or ammonium persulfates, perborates, percarbonates, and the like. Such catalysts usually are used in the range from about 0.01 percent to about 0.2 percent, based on the weight of the monomers. Other methods of catalysis, such as irradiation by ultraviolet, X-ray and gamma rays as well as by radiation from linear accelerators, resonant transformers, and the like, may be used if desired.

The ethylene/polyalkylene glycol ether-acrylic acid copolymers of the present invention either alone or modified with fillers, synthetic resins and plasticizers may be molded into useful articles by any of the various types of molding operations known to the art such as injection molding, compression molding, extrusion and transfer molding.

An outstanding advantage of the polymers of this invention is the fact that they cross-link upon heating to a moderate temperature i.e. 60–140° C. and thus the melt index decreases. This makes them suitable for use as:

(1) Wire and cable jacketing polymers. The use of peroxide crosslinking agents in polymers in order to cause crosslinking is known to improve the stress crack resistance. The instant polymers do not require added crosslinking agents, thus are readily applicable to wire and cable jacketing uses. The thermal crosslinking decreases the melt index thereby improving the stress crack resistance, the low temperature brittleness, and the ability to resist melting when the jacketed wire is subjected to heating caused by high power loads.

(2) High impact shipping bags. Generally, polymers of low melt index are selected for use in making high impact strength shipping bags, but such low melt index polymers require high die temperatures and high power requirements for extrusion. Polymers made by the instant invention can be extruded into bagging films and then thermally crosslinked to achieve high impact strength.

(3) Shrink films. The thermally crosslinked polymers of the instant invention can be blown into film which is heat-shrinkable, thus irradiation of the polymer is not required.

To illustrate the manner in which the invention may be carried out, the following example is given. It is to be understood, however, that the example is for the purpose of illustration and the invention is not to be regarded as limited to any of the specific materials or conditions recited therein. Unless otherwise stated, all percentages cited in the example below are based on weight.

EXAMPLE

Ethylene and diethylene glycol n-butyl ether acrylate (DEGBEA) were copolymerized in a series of runs identified and further described in the table below. The runs were carried out in a continuous manner in a 5-liter pressure autoclave stirred at 1200 r.p.m. at a temperature between 198° C. and 205° C. and a pressure between 18,000 and 21,000 p.s.i., using 2 percent by weight lauroyl peroxide catalyst solution as the initiator.

The table shows the average rate of feed of ethylene and DEGBEA, in pounds per hour, introduced into the autoclave. The amount of DEGBEA found in each copolymer product produced and the amount of copolymer produced is also shown.

The table further shows properties of the resulting copolymer products.

with ethylene in place of the esters set forth in the above example.

TABLE

|  | Run Number | | | | |
|---|---|---|---|---|---|
|  | 1 | 2 | 3 | 4 | 5 |
| Ethylene Feed Rate, lbs./hr | 42.0 | 41.0 | 37.4 | 32.0 | 39.0 |
| DEGBEA Feed Rate, lbs./hr | 1.17 | 1.37 | 1.2 | 1.22 | 1.94 |
| Percent DEGBEA in Product | 13.7 | 18.6 | 18.8 | 23.0 | 27.1 |
| Copolymer Production Rate, lbs./hr | 4.3 | 4.25 | 6.00 | 3.00 | 4.00 |
| Melt Index, dg./min | 0.36 | 1.02 | 9.03 | 3.44 | 7.22 |
| Tensile Strength, p.s.i | 1,375 | 1,125 | 1,055 | 780 | 475 |
| Yield Strength, p.s.i | 955 | 790 | 890 | 690 | 350 |
| Elongation, Percent | 565 | 655 | 555 | 490 | 195 |
| Rigidity×10⁻⁴ | 0.76 | 0.57 | 0.72 | 0.41 | 0.27 |
| Hardness | 70 | 65 | 70 | 60 | 50 |
| Setting Up Grade | 0.25 | 0.31 | 0.96 | 0.27 | <0.01 |
| Low Temperature Brittle Point, °C | ND | ND | −50 | −70 | −60 |

Melt index is measured by ASTM D–1238–62T (condition E).

Tensile and yield strength in p.s.i. and elongation in percent of original length at break are measured by ASTM D–638–58T on specimens cut using die B of ASTM D–412–51T pulled at 10 inches per minute.

Rigidity is by ASTM D–747–58T.

Hardness is by Shore C method.

Setting up Grade is the melt index of the polymer after being heated at 100° C. in air for 48 hours and is a measure of the thermosetting properties of the polymer. In this test, the polymer is granulated, and a 2 ounce wide mouth jar is filled with the granules. The open jar is then heated for 48 hours in air at 100° C. The melt index of the polymer is then measured in accordance with ASTM D–1238–62T (condition E).

Low temperature Brittle Point is by ASTM D–746–52T.

ND means not determined.

Results similar to the foregoing may also be obtained when any of the other enumerated polyalkylene glycol ether-acrylic or methacrylic acid esters are copolymerized

What is claimed is:

1. A copolymer having an average molecular weight in the range from about 20,000 to about 65,000 comprising the reaction product of from about 63–99 percent by weight of ethylene and about 1 to about 37 percent by weight of a polyalkylene glycol ether ester of an acid selected from the group consisting of acrylic and methacrylic acid, having from 2 to 10 alkylenoxy groups in a straight chain, each alkylenoxy group having from 2 to 3 carbon atoms, and a terminal alkoxy group having from 1 to 4 carbon atoms.

2. The copolymer of claim 1 wherein the ester is diethylene glycol n-butyl ether acrylate.

References Cited

UNITED STATES PATENTS

| 2,200,429 | 5/1940 | Perrin et al. | 260—80 |
| 2,458,333 | 1/1949 | Rehberg et al. | 260—83 |
| 3,141,870 | 7/1964 | Deex | 260—86.7 |

JOSEPH L. SCHOFER, Primary Examiner

J. C. HAIGHT, Assistant Examiner

U.S. Cl. X.R.

260—86.1